(12) United States Patent
Palmer

(10) Patent No.: US 9,349,223 B1
(45) Date of Patent: May 24, 2016

(54) SYSTEM FOR ADVERTISING VEHICLE INFORMATION WIRELESSLY

(71) Applicant: Brian Palmer, Orem, UT (US)

(72) Inventor: Brian Palmer, Orem, UT (US)

(*) Notice: Subject to any disclaimer, the term of this patent is extended or adjusted under 35 U.S.C. 154(b) by 262 days.

(21) Appl. No.: 13/860,428

(22) Filed: Apr. 10, 2013

(51) Int. Cl.
*G07C 5/00* (2006.01)
*G07C 5/08* (2006.01)
*H04W 8/00* (2009.01)
*H04L 29/08* (2006.01)
*G06F 17/00* (2006.01)

(52) U.S. Cl.
CPC *G07C 5/008* (2013.01); *G07C 5/08* (2013.01); *H04L 67/12* (2013.01); *H04W 8/005* (2013.01); *G06F 17/00* (2013.01)

(58) Field of Classification Search
CPC ......... G07C 5/008; G07C 5/08; H04W 4/023; H04W 8/005; G06F 17/00; H04L 67/12
See application file for complete search history.

(56) References Cited

U.S. PATENT DOCUMENTS

| 5,796,401 A | 8/1998 | Winer |
| 5,884,202 A * | 3/1999 | Arjomand ..................... 701/31.4 |
| 6,795,760 B2 | 9/2004 | Fuller |
| 6,807,469 B2 * | 10/2004 | Funkhouser et al. ........ 701/31.8 |
| 7,116,216 B2 | 10/2006 | Andreasen |
| 7,786,851 B2 | 8/2010 | Drew |
| 7,853,375 B2 | 12/2010 | Tuff |
| 7,920,102 B2 | 4/2011 | Breed |
| 7,928,837 B2 | 4/2011 | Drew |
| 8,126,399 B1 * | 2/2012 | Lee ............................. 455/41.2 |
| 8,180,522 B2 | 5/2012 | Tuff |
| 8,719,388 B2 * | 5/2014 | Giusti .......................... 709/222 |
| 8,884,749 B1 * | 11/2014 | Palmer ......................... 340/438 |
| 8,897,952 B1 * | 11/2014 | Palmer ......................... 701/31.5 |
| 2003/0058280 A1 | 3/2003 | Molinari |
| 2004/0266449 A1 * | 12/2004 | Smetters et al. ............ 455/452.1 |
| 2006/0161315 A1 * | 7/2006 | Lewis et al. ....................... 701/1 |
| 2006/0178793 A1 * | 8/2006 | Hecklinger ..................... 701/35 |
| 2006/0277498 A1 | 12/2006 | Mann |
| 2006/0277499 A1 | 12/2006 | Britt |
| 2008/0033609 A1 * | 2/2008 | Razavi ............................ 701/33 |
| 2008/0119981 A1 * | 5/2008 | Chen .............................. 701/33 |
| 2008/0126352 A1 | 5/2008 | Case |
| 2008/0126521 A1 * | 5/2008 | Hanes .......................... 709/221 |

(Continued)

FOREIGN PATENT DOCUMENTS

EP 1513288 9/2005

OTHER PUBLICATIONS

Palmer, Brian, Image of web page for PCMScan software product, abt. 2005.

(Continued)

*Primary Examiner* — Helal A Algahaim
*Assistant Examiner* — Donald J Wallace
(74) *Attorney, Agent, or Firm* — ColterJennings

(57) ABSTRACT

A system and apparatus for advertising vehicle information using network names includes a wireless transceiver removably attached to the data port of a vehicle. The transceiver creates a wireless network having a unique name. The transceiver advertises vehicle specific information as part of the wireless network name. The transceiver communicates the network name to an app running on a wireless user computing device. A plurality of unique network names may be collected by the app and stored for use in researching additional information about each vehicle having such a transceiver mounted thereon.

20 Claims, 2 Drawing Sheets

(56) References Cited

U.S. PATENT DOCUMENTS

| | | | |
|---|---|---|---|
| 2008/0137860 A1 | 6/2008 | Silvernail | |
| 2008/0140281 A1 | 6/2008 | Morris | |
| 2008/0147268 A1 | 6/2008 | Fuller | |
| 2009/0184812 A1 | 7/2009 | Drew | |
| 2010/0256861 A1* | 10/2010 | Hodges | 701/33 |
| 2011/0258044 A1 | 10/2011 | Kargupta | |
| 2011/0313593 A1 | 12/2011 | Cohen | |
| 2012/0106342 A1 | 5/2012 | Sundararajan | |
| 2012/0197484 A1* | 8/2012 | Nath et al. | 701/32.4 |
| 2012/0203441 A1* | 8/2012 | Higgins et al. | 701/102 |
| 2012/0246036 A1* | 9/2012 | Marr et al. | 705/27.1 |
| 2013/0173358 A1* | 7/2013 | Pinkus | 705/14.1 |
| 2013/0289819 A1* | 10/2013 | Hassib et al. | 701/29.6 |
| 2013/0295912 A1* | 11/2013 | Chen | 455/420 |
| 2014/0195654 A1* | 7/2014 | Kiukkonen et al. | 709/220 |
| 2014/0379174 A1* | 12/2014 | Holub et al. | 701/2 |
| 2015/0073647 A1* | 3/2015 | Ubik et al. | 701/29.1 |

OTHER PUBLICATIONS

Palmer, Brian, User Manual for PCMScan Software, abt. 2005.
Analogic by AeroForce Technology (analogic_user_manual_rev2.pdf).
BMW N54 N55 135 335 535 Turbo Performance Forum (BMW_JB4_N54tech.pdf).
CAN Tool Guide for 2008+ BMW 13513351535/X5 (BMW_CAN_tool.pdf).
Interceptor scan gauge for ISO vehicles by AeroForce Technology (Interceptor_USER_MANUAL_rev_5_2_2.pdf).
ISO 15765-4 Jan. 2005 (ISO_15765-4_2005.pdf).
ISO 9141 AN602 by John Bendel Apr. 1996 (iso9141_an602.pdf).
ISO 9141-2 Feb. 1994 (ISO9141-2_1994.pdf).
ISO/DIS 13400-1 Sep. 2010/Feb. 2011 (ISO_DIS_13400-1.pdf).
ISO/DIS 13400-2 Sep. 2010/Feb. 2011 (ISO_DIS_13400-2.pdf).
ISO/DIS 13400-3 Sep. 2010/Feb. 2011 (ISO_DIS_13400-3.pdf).
Juice Box Stage 4 PnP—135/335/535 Installation Guide—Jun. 20, 2012 (JB4PnP.pdf).
KWP 2000/14230-1 Oct. 1997 (14230-1s.pdf).
KWP 2000/14230-2 Apr. 1997 (14230-2s.pdf).
KWP 2000/14230-3 Feb. 2000 (14230-3s.pdf).
New! JB4 PNP (N54 Stage 3) BMW Performance Tuner (BMW_JB4.pdf).
WindowValet for C6/XLR (WV-110.pdf).
The Dashtronix Progressive Shift—Corvette (Progressive_Shift Manual_Corvette.pdf).
SAE J1850 Jun. 2006 (saej1850v004.pdf).
SAE J1962 Apr. 2002 (saej1962v003.pdf).
SAE J1978 Apr. 2002 (saej1978v003.pdf).
SAE J1979 May 2007 (saej1979v003.pdf).
SAE J2178-1 Jul. 2004 (saej2178-1v003.pdf).
SAE J2178-2 Jul. 2004 (saej2178-2v003.pdf).
SAE J2178-3 Jul. 2004 (saej2178-3v004.pdf).
SAE J2178-4 Jul. 2004 (saej2178-4v003.pdf).
SAE J2190 Jun. 1993 (saej2190v001.pdf).
SAE J2534-1 Dec. 2004 (saej2534-1v002.pdf).
SAE J2534-2 Mar. 2006 (saej2534-2v001.pdf).
The Dashtronix Gauge ProjectorTM—Corvette (Gauge_Projector_Manual_Corvette.pdf).
The Dashtronix Radar Projector™ User's Manual—Corvette (Radar_Projector_Manual_Corvette.pdf).
BurgerTuning.com BMS CAN Tool (CT) with Shift Light (BMW_CAN_Tool2.pdf).

* cited by examiner

SYSTEM FOR ADVERTISING VEHICLE INFORMATION WIRELESSLY

BACKGROUND

This application relates generally to a method and system for advertising vehicle information for a plurality of nearby vehicles over a wireless signal.

Since at least 1996, every light duty passenger vehicle sold in the United States has had a computer diagnostic data connection port, such as an OBD1, OBD2, or SAE-J1962 port. This data port permits a mechanic or other user to connect to the vehicle and retrieve vehicle diagnostic and identification data, that is, data about the vehicle, including Vehicle Identification Number ("VIN"), engine, fuel system, brake system, door locks, climate control systems, and other data. Scan tools have been developed to permit mechanics and repair technicians to connect to the vehicle and monitor sensor data in real time as well as read and clear trouble codes and reset engine operating data and learned values.

Many wireless communications mediums exist, such as 802.11 WiFi, Bluetooth, or some other wireless communications protocol or system. Often these wireless communications protocols require that, to communicate with other devices using that protocol, a user must first fully connect to that wireless system. This process can involve steps like joining the network or pairing with other wireless devices. This is usually a manual process requiring end-user assistance. Often times the end-user may be required to enter a password or pairing code or some other security key code.

Most wireless communications systems where multiple separate systems can coexist near each other have some sort of identification system, or name, whereby a user chooses the wireless system, by name. For example, a Bluetooth device may broadcast a device name, or an 802.11 WiFi network may broadcast a network name, also known as a SSID, etc. In these wireless systems, having a name collision (that is, two or more separate wireless systems utilizing the exact same name) can result in the inability to communicate on those wireless systems and/or cause confusion about which system the user is actually using.

Many vehicle diagnostic data adapters, or OBD adapters, currently exist that permit connecting to the vehicle diagnostic data port over a wireless communications medium, such as an 802.11 WiFi, Bluetooth, or other wireless communications protocol or system. In an effort to solve the name collision problem, these adapter vendors have typically given their adapters a wireless name that is unique to their company. Some vendors have gone even farther by incorporating an adapter-specific piece of information into the name, such as the serial number of the adapter or some part of the wireless MAC address.

Many existing software applications, or apps, are able to communicate with vehicles in a bidirectional manner over wireless communications mediums on computing devices such as desktops, laptops, smartphones, tablets, and other user computing devices by connecting to these diagnostic data adapters. On some computing devices, such as Apple iOS devices, the platform vendor may lock down or restrict the capabilities of software applications running on those platforms such that the end-user is required to manually connect that computing device to each wireless system. On these platforms, the software application is unable to automate the process for the end-user. If a software application wanted vehicle information from a nearby vehicle, the software application would need to read this information from that vehicle by connecting to the wireless communications system in use by the vehicle (or more specifically the vehicle OBD adapter) and communicating the relevant information. In situations where the software application wanted to get a list of vehicle identification information for multiple nearby vehicles, such as when a user is walking in a dealer or vehicle fleet parking lot, this could involve numerous end-user interactions to manually connect the computing device to each separate wireless vehicle system. This might render such communications so tedious and time-consuming as to perhaps be too inconvenient for practical purposes. Therefore, having a method to obtain vehicle information from multiple vehicles without having to first establish a connection to each wireless vehicle system would be useful.

SUMMARY

The present system includes a wireless transceiver removably attached to a vehicle data port that communicates with electronic control modules within the vehicle. The system requires no permanent installation or changes to the vehicle and permits the user to unplug and remove the transceiver from the vehicle when no longer needed or wanted. The transceiver includes wireless communications capabilities and advertises vehicle specific information as part of the wireless network name.

Thus, a user may open an app on a wireless device, such as a mobile smart phone or a tablet, and the app reads the names of all of the wireless networks (such as the 802.11 network SSID and/or Bluetooth pairing name). The app stores those names for future use. There are numerous examples of possible uses for the network name data.

For example, the user could log in to a central server, such as an automobile dealership network. From there, the user could tell the central server to take the name data, cull out the trucks from the data, and provide the user with information regarding those trucks. The user would then have all of that information available when deciding which trucks to test drive or otherwise research.

BRIEF DESCRIPTION OF THE DRAWINGS

Other features and advantages of the present invention will be apparent from the following Detailed Description taken in conjunction with the accompanying Drawings, in which.

DETAILED DESCRIPTION

Modern vehicles typically have a data port, such as an On-Board Diagnostics II port ("OBD-II port") for communicating between the vehicle and a user. These data ports may be fitted with a wireless transceiver, such as an 802.11 WiFi, Bluetooth, or some other wireless communications protocol or system, to permit users wirelessly to communicate with the vehicle data port. According to the present method and system, users running an app on a wireless computing device (such as a phone or tablet) are able to receive information about one or more vehicles by using the names of the networks set up by the various wireless transceivers fitted to each of the vehicles, with no need to log in or otherwise connect to each vehicle individually.

Figure 1:
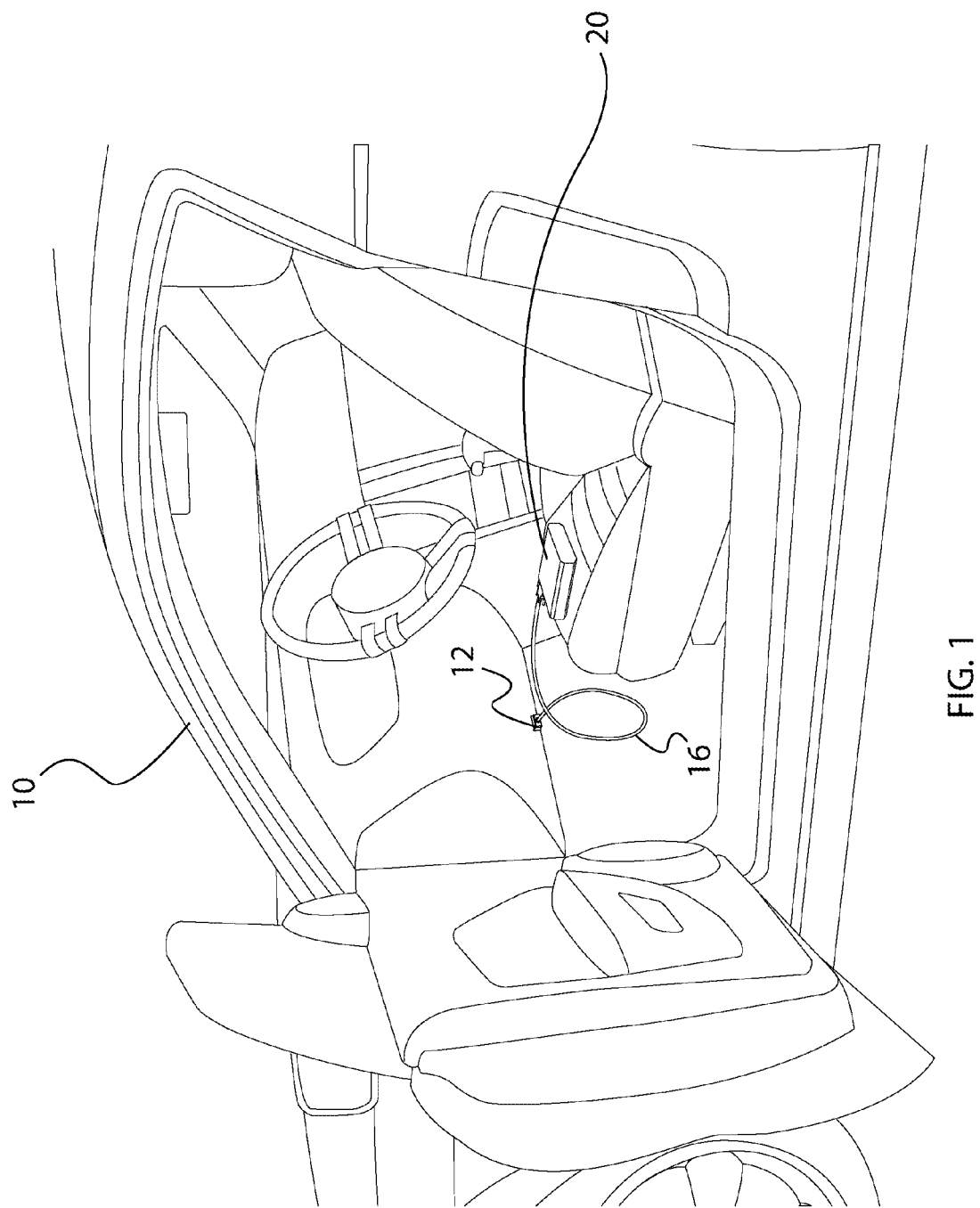
FIG. 1 depicts a perspective view of an exemplary interior of a vehicle having a data port in which the present system may be deployed with a transceiver mounted to the data port.

As depicted in FIG. 1, a vehicle 10 includes at least one vehicle data port 12, which is typically an OBD-II port but may be other data ports. In the embodiment depicted in FIG. 1, a cable 16 connects the data port 12 to a wireless transceiver 20. The transceiver 20 enables wireless communications between users and the vehicle data port 12. In other embodiments, the transceiver 20 may be directly connected to the data port 12 without an intermediate cable 16.

Figure 2:
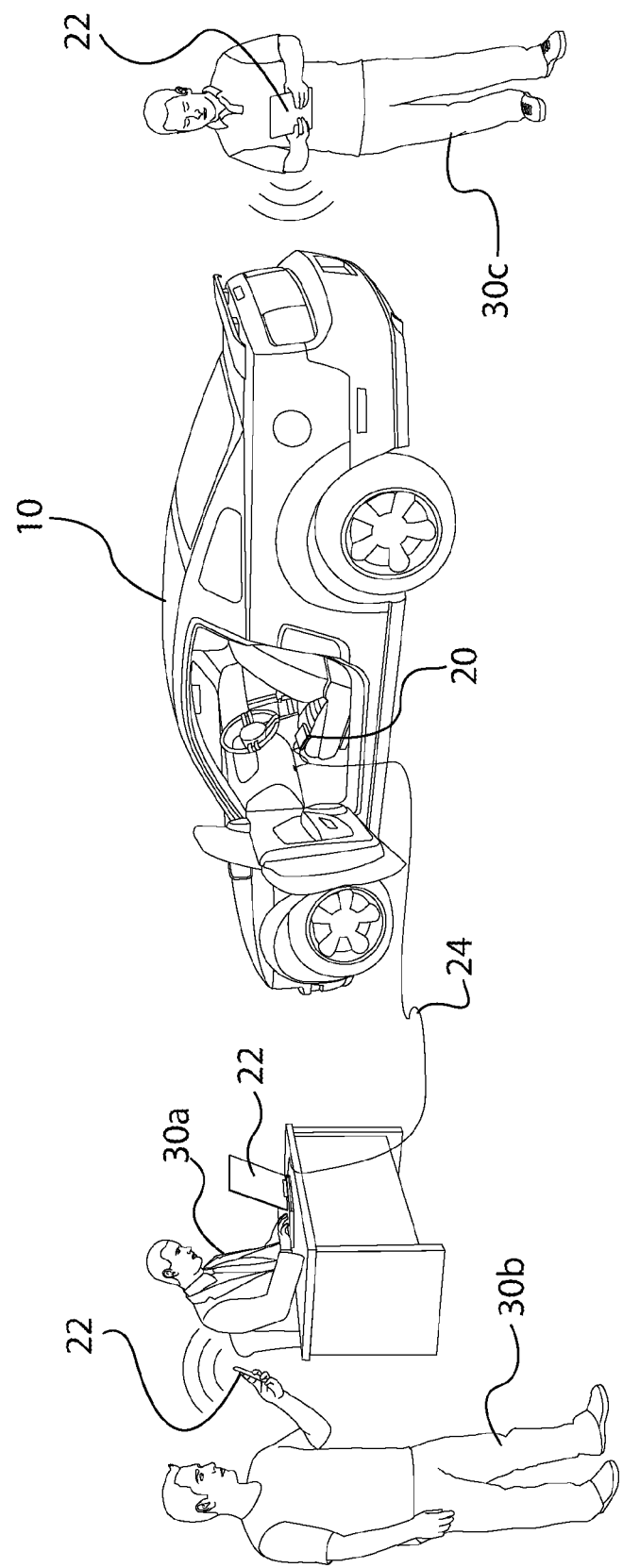
FIG. 2 depicts a perspective view of several users communicating with a network formed by a transceiver mounted in the vehicle.

As depicted in FIG. 2, an independent user computing device 22 may be connected to the transceiver 20 using a communications cable 24. A user 30a communicates through the cable 24, which communication is typically used for configuring the transceiver 20, as often such transceivers are not configured wirelessly. Other users 30b and 30c communicate with the transceiver 20 through wireless computing devices 22, such as smart phones or tablets.

Each transceiver 20 has its own name; that is, each transceiver 20 sets up a 802.11 WiFi, Bluetooth, or other wireless communications system (that is, a wireless communications network or other wireless communications arrangement), giving the system (or network) a unique name. As depicted in FIG. 1, the transceiver may be pre-configured, that is, the user 30a may assign to the transceiver a specific name for that transceiver's network (or system, if the specific communications protocol used by the transceiver does not otherwise provide what may be considered a fully functioning communications network). For example, a dealership might have a number of transceivers, and the dealership may elect to assign a name to each transceiver for the dealership's own purposes.

Alternatively, each transceiver 20 may be designed to use the information available on the vehicle data port 12 to generate the name of the network. For example, if the VIN of the automobile 10 is ABC123, the transceiver 20 could automatically read that VIN when plugged in to the data port 12, and use that VIN as the network (or system) name (hence the network would be named ABC123), or incorporating that VIN as a part of the network name (hence the network might me named Dodge-ABC123 or Chevy-123). Alternatively, the transceiver could be designed to generate an alias from that VIN and use the alias as the network name. When using vehicle specific information, the network name would automatically change if the transceiver is plugged into the data port of another vehicle.

As a result of this network naming, as users 30b and 30c walk around a dealership lot, an app on their mobile devices 22 might pick up numerous different network names. Those names are stored by the app for future use. The users could then connect to a server, such as the Internet or the dealership's own wireless network, and communicate the network names to the server.

Once connected, the users would be able to access additional information about the different vehicles on the lot. For example, one user might be in the market for a mid-sized truck. Using just the network names stored on the user's mobile device 22 (and made available to the server by the app), the server could filter out all other vehicles, and provide the user with further information about the mid-sized trucks. This information could include whatever the dealership wanted to make available, such as photographs, fuel economy estimates, actual mileage of used trucks, color and trim of the trucks, engine size, towing capacity, links to web pages regarding reviews of the various trucks or manufacturer's web pages, etc. The server could also send information to the app about other similar vehicles for which the app may not have located a nearby wireless network name, or even similar vehicles from a completely different dealership location.

The transceiver 20 may also be configured to incorporate multiple distinct pieces of vehicle information as part of the network name. In such a case, the network naming conventions might utilize a delimiter sequence to separate the distinct pieces of vehicle information. Additionally, each distinct piece of vehicle information may also include a predetermined prefix or postfix label.

For example, if the transceiver 20 is configured to use the asterisk character ("*") as a delimiter and to incorporate the vehicle odometer reading and the VIN as part of the wireless network name, and the vehicle odometer reading was 45678 and the VIN was ABC123, then the transceiver might advertise a wireless network name of 45678*ABC123. To further clarify the data, the transceiver might prefix the vehicle information with a specific label, such as "ODO:" for odometer or "VIN:" for the VIN. In this example, the transceiver 20 may advertise a wireless network name of ODO:45678*VIN:ABC123. Depending on the data available from the vehicle 10 through the diagnostic data port, having a delimiter or label to allow for multiple distinct pieces of data may be useful.

Some vehicles 10 may not respond to information requests from the transceiver 20 while the vehicle 10 is not running. In these vehicles, it may be useful if the transceiver 20 entered a low power mode until the vehicle starts up, at which point the transceiver could then read the vehicle information through the data port 12. Alternatively, instead of sleeping, the transceiver could utilize a different predetermined wireless network name until the transceiver is able to read vehicle specific information and incorporate it as part of the wireless network name. For example, the transceiver may be configured to advertise a specific dealer stock number as part of the wireless network name until the transceiver is able to read the VIN and odometer from the vehicle, at which point the transceiver starts advertising the VIN and odometer instead of the dealer stock number.

In some situations, the transceiver 20 may be attached to a vehicle 10 for many weeks, or even months, without the vehicle being started or driven during that time. Because the vehicle data port 12 is usually continually powered, even while the vehicle 10 is off, leaving the transceiver 20 connected may completely deplete the vehicle battery, requiring a jump-start or charging system before the vehicle 10 could be started or driven again. Thus, the transceiver may be configured to detect a specific battery condition or vehicle voltage level, such as a low or dead battery. Upon detecting this condition, the transceiver 20 may be configured to enter a low-power sleep mode or completely shut off to reduce or eliminate battery or energy consumption. Alternatively, the transceiver might detect a low battery and start to alter the wireless signal in various ways, such as by only intermittently broadcasting a wireless signal, thereby reducing battery or energy consumption while still allowing for some limited functionality, until the battery is considered too low, at which point the transceiver 20 may go into a sleep mode or completely power down.

Because the transceiver 20 includes wireless communications capabilities, including embodiments in which the transceiver is capable of multiple types of wireless communications, the transceiver may be configured to communicate vehicle operational information to a central server. For example, the transceiver 20 might read tire pressure information along with battery or voltage levels and odometer information and periodically connect to a central server and transmit that information to the server. This information could then be used by the server to help track vehicle health and maintenance. The server could monitor this information and automatically notify technicians that a vehicle battery is running low or that a tire needs to be inflated or even that the vehicle needs an oil change. There are many possible uses for this information by the server.

The transceiver 20 may also be configured to download information from the server to be advertised as part of the wireless network name. For example, the transceiver could periodically connect to the server and communicate vehicle specific information to the server. The server could then respond to the transceiver with a special incentive, price break, or offer about the vehicle 10. The transceiver 20 could then incorporate this information as part of the wireless network name.

In other embodiments, the transceiver 20 includes GPS or location tracking functionality. The transceiver may then incorporate vehicle location data in the wireless network name or even transmit vehicle location data to a server. The location data could then be used to assist users in locating the vehicle 10.

The transceiver 20 may be any of a number of devices, such as a specialized OBD adapter or a laptop computer with specialized software and communications protocols loaded thereon, or various combinations of those devices and other OBD or other automotive hardware. Typically the transceiver 20 is a wireless interface as is known in the art, such as a Kiwi Wifi or Kiwi Bluetooth model sold by PLX Devices of Sunnyvale, Calif. or an OBDLink WiFi or OBDLink Bluetooth sold by ScanTool.net of Phoenix, Ariz. Communications with each transceiver 20 may be accomplished using standard wireless devices, such as smart phones and tablets and laptop computers.

The present method allows users to identify a plurality of vehicles by using the wireless network or system name, which name is broadcast by different vehicles. As a result, users can learn about the vehicles without having to manually log in or connect to the wireless networks. Thus, the present disclosure has numerous advantages. While the disclosure is susceptible to various modifications and alternative forms, specific embodiments have been shown by way of example in the drawings and have been described in detail. However, the disclosure is not intended to be limited to the particular forms disclosed. Rather, the disclosure is to cover all modifications, equivalents, and alternatives falling within the scope of the invention as defined by the following appended claims and their legal equivalents. For example, elements and features disclosed in relation to one embodiment may be combined with elements and features disclosed in relation to other embodiments of the disclosure.

The invention claimed is:

1. A system for wirelessly advertising vehicle specific information comprising:
   a device adapted to be removably attached to a vehicle diagnostic data port;
   the device being configurable by a vehicle operator or other user;
   the device being capable of communicating through the vehicle diagnostic data port with at least one built-in vehicle electronic control module;
   the device being capable of communicating over a wireless communications system external to the vehicle diagnostic data port;
   the device configured to read or request or communicate vehicle specific information from the vehicle diagnostic data port; and
   the device incorporating the vehicle specific information as part of a wireless communications system name, whereby the vehicle specific information is visible on an external independent user computing device without requiring a user to open a wireless communications connection or socket between the device and the external independent user computing device, and whereby the device automatically changes the wireless communications system name in real time upon receiving a change in the vehicle specific information obtained from the vehicle through the vehicle diagnostic port.

2. The system of claim 1 wherein the vehicle specific information includes at least one of the following items: VIN, calibration identifiers, model numbers, part numbers, vehicle sensor data, vehicle codes, vehicle parameters, dealer stock numbers, battery voltage levels, odometer readings, engine hours, oil life, service interval information, average speed, fuel economy information, trouble codes, service related information, operational state, GPS coordinates or vehicle location.

3. The system of claim 1 wherein the device supports wireless communications on at least one of: 802.11 WiFi, Bluetooth, RFID, Near Field Communication, Infrared, Microwave, or Cellular.

4. The system of claim 3 wherein the device communicates vehicle specific information over more than one wireless system simultaneously.

5. The system of claim 1 wherein the device reads vehicle specific information immediately upon being connected to a vehicle diagnostic data port.

6. The system of claim 1 where the device reads vehicle specific information upon vehicle startup, power-on, or ignition-on.

7. The system of claim 6 wherein the device transmits a user configured identifier as part of the wireless communications system name until the device has been able to read vehicle specific information.

8. The system of claim 1 wherein the device transmits vehicle specific information to an external server and receives a response back and incorporates at least part of the server response as part of the wireless communications system name.

9. The system of claim 8 wherein the server response includes at least one of the following items: vehicle price/rebates/discounts/fees/special deals/tax incentives/guarantees, warranty information, number of previous owners, vehicle condition or damage, title status, number of times serviced, if serviced regularly, vehicle certification, vehicle location, test drive information, tire wear, vehicle aftermarket accessories, vehicle color, or other vehicle attributes.

10. The system of claim 8 wherein the device transmits battery voltage, trouble codes, vehicle service related information, operational state, or other vehicle data to an external server for vehicle maintenance or service tracking purposes.

11. The system of claim 8 where the device transmits vehicle information to an external server upon, during, or after vehicle startup, power-on, or ignition-on.

12. The system of claim 1 where the device only selectively, intermittently or periodically transmits a wireless signal, thereby reducing vehicle battery or energy consumption.

13. The system of claim 12 wherein the device detects a predetermined battery condition or voltage level and alters the wireless signal or enters a sleep mode to reduce or to eliminate vehicle battery or energy consumption.

14. The system of claim 1 wherein the device uses a predetermined delimiter sequence comprising one or more predetermined characters in the wireless communications system name to separate multiple unique fields or distinct pieces of vehicle or other data.

15. The system of claim 1 wherein the device incorporates GPS or location tracking functionality.

16. The system of claim 15 wherein the device powers up or reads location functionality only during vehicle startup, power-on, or ignition-on.

17. The system of claim 1 wherein the device allows pass-thru communication with the vehicle in a bidirectional manner using either a wireless or wired connection.

18. The system of claim 1 further comprising an app that runs on a wireless user computing device, the app configured to read the wireless communications system name and thereby permit a user to learn information about the vehicle from the wireless communications system name.

19. A system for wirelessly advertising a unique vehicle identifier comprising:
- a device adapted to be removably attached to a vehicle diagnostic data port;
- the device being capable of communicating over a wireless communications system external to the vehicle diagnostic data port; and
- the device incorporating the unique vehicle identifier as part of a wireless communications system name, whereby the unique vehicle identifier is visible on an external independent user computing device without requiring a user to open a wireless communications connection or socket between the device and the external independent user computing device, and whereby the device automatically changes the unique vehicle identifier as part of the wireless communications system name in real time upon receiving a change in the unique vehicle identifier obtained from the vehicle through the vehicle diagnostic.

20. An apparatus for wirelessly advertising vehicle specific information comprising:
- a device adapted to be removably attached to a vehicle diagnostic data port;
- the device being configurable by a vehicle operator or other user;
- the device being capable of communicating through the vehicle diagnostic data port with at least one built-in vehicle electronic control module;
- the device being capable of communicating over a wireless communications system external to the vehicle diagnostic data port;
- the device configured to read or request or communicate vehicle specific information from the vehicle diagnostic data port; and
- the device incorporating the vehicle specific information as part of a wireless communications system name, whereby the vehicle specific information is visible on an external independent user computing device without requiring a user to open a wireless communications connection or socket between the device and the external independent user computing device, and whereby the device automatically changes the wireless communications system name in real time upon receiving a change in the vehicle specific information obtained from the vehicle through the vehicle diagnostic port.

* * * * *